(12) United States Patent
Yamada (10) Patent No.: US 7,561,564 B2
(45) Date of Patent: Jul. 14, 2009

(54) IP TELEPHONE

(75) Inventor: Tomohiro Yamada, Hyogo (JP)

(73) Assignee: Kyocera Corporation, Kyoto (JP)

( * ) Notice: Subject to any disclaimer, the term of this patent is extended or adjusted under 35 U.S.C. 154(b) by 100 days.

(21) Appl. No.: 10/569,975

(22) PCT Filed: Aug. 23, 2004

(86) PCT No.: PCT/JP2004/012433

§ 371 (c)(1),
(2), (4) Date: Feb. 28, 2006

(87) PCT Pub. No.: WO2005/022873

PCT Pub. Date: Mar. 10, 2005

(65) Prior Publication Data

US 2007/0008950 A1   Jan. 11, 2007

(30) Foreign Application Priority Data

Aug. 28, 2003  (JP) .............................. 2003-303812

(51) Int. Cl.
*H04L 12/66* (2006.01)
*H04M 7/00* (2006.01)
(52) U.S. Cl. .................................. 370/352; 379/220.01
(58) Field of Classification Search ......... 370/353–356; 379/220.01, 88.17

See application file for complete search history.

(56) References Cited

U.S. PATENT DOCUMENTS

| 6,084,951 A | * | 7/2000 | Smith et al. ............... 379/93.17 |
| 6,691,165 B1 | * | 2/2004 | Bruck et al. ................. 709/227 |
| 7,221,748 B1 | * | 5/2007 | Moore et al. ........... 379/142.15 |
| 7,269,162 B1 | * | 9/2007 | Turner ........................ 370/352 |
| 2002/0051188 A1 | * | 5/2002 | Kim .......................... 358/1.15 |
| 2004/0072544 A1 | * | 4/2004 | Alexis ........................ 455/74.1 |
| 2005/0025294 A1 | * | 2/2005 | Matsuhashi et al. ...... 379/88.17 |

FOREIGN PATENT DOCUMENTS

| JP | 63-42259 | 2/1988 |
| JP | 2002-27084 | 1/2002 |
| JP | 2003-18294 | 1/2003 |

* cited by examiner

*Primary Examiner*—William J Deane
(74) *Attorney, Agent, or Firm*—Morrison & Foerster LLP (57) ABSTRACT

An IP telephone determines, in making a telephone call, whether a called party's telephone is an IP telephone or not (S17). If determination result is affirmative, a flag 2 is turned on (S19). Then, a marker indicating that the called party is an IP telephone is added to telephone control information for the called party registered in a telephone directory within a memory (S59, S65). This makes it possible to know, in making a telephone call to the called party from next time onward, whether the called party's telephone is an IP telephone or not prior to establishment of connection with the called party, from the presence or absence of the marker in the telephone directory.

9 Claims, 6 Drawing Sheets

IP TELEPHONE

TECHNICAL FIELD

The present invention relates to an IP (Internet Protocol) telephone. More specifically, the present invention relates to an IP telephone having an identification capability to determine whether an opposite party of a telephone call is an IP telephone or not.

PRIOR ART

One example of this kind of conventional IP telephone is disclosed in a non-patent document "BB Phone User's Guide" p. 16 (published by SOFTBANK BB Corporation on Mar. 25, 2003). The IP telephone described in the non-patent document produces a connection tone "pupupu" prior to a ring tone when it makes a call to a land telephone or the like other than IP telephone, and produces a connection tone "pupupu, pupupu" prior to a ring tone when it makes a call to another IP telephone. In this manner, the prior art identifies the type of the telephone to which connection is to be made, by the use of different connection tones.

The prior art shown in the non-patent document does not make it possible to determine whether or not the called party is an IP telephone until connection with the called party is actually established. Therefore, there exists such a problem where the calling party cannot make a decision in advance to speak short or have a long conversation in consideration of the telephone rate.

SUMMARY OF THE INVENTION

Therefore, it is a primary object of the present invention to provide a novel IP telephone.

It is another object of the present invention to provide an IP telephone that makes it possible to know before making a connection with a called party whether the called party is an IP telephone or not.

An IP telephone according to the present invention of claim 1 is an IP telephone with an identification capability to identify in making a call whether an opposite party's telephone is an IP telephone or not, comprising a registration means for registering telephone management information including a telephone number in a memory, and an addition means for adding a marker to telephone management information on the opposite party, out of the telephone management information registered in the memory, when a result of determination through the use of the determination capability is affirmative.

In the present invention of claim 1, in making a call, the opposite party's telephone is identified as an IP telephone or not, and the telephone management information including the opposite party's telephone number and name is registered in a telephone directory formed in the memory. Then, if the opposite party is an IP telephone, the marker showing that the opposite party is an IP telephone is added to the telephone management information on the opposite party registered in the telephone directory (memory). Thus, according to the present invention of claim 1, in making a call to the opposite party from next time onward, it is possible to know before communication whether the opposite party's telephone is an IP telephone or not by the presence or absence of the marker in the telephone directory. This makes it possible to make a decision in advance to speak short or have a long conversation in consideration of the telephone rate.

An IP telephone according to the present invention of claim 2 depends on claim 1, and further comprises an output means for outputting the telephone management information in response to a specific operation.

In the present invention of claim 2, by performing a specific operation such as a press of a predetermined button, the telephone directory (telephone management information) appears on a display of an IP telephone. Thus, according to the present invention of claim 2, it is possible at any time to, by performing the specific operation, consult the telephone directory (telephone management information) and know whether the opposite party with which communication is desired is an IP telephone or not.

An IP telephone according to the present invention of claim 3 depends on claim 1, and further comprises a request means for requesting a specific server to transmit an IP address corresponding to a dialed telephone number, a first calling means for, when the specific server has returned the IP address in response to the request from the request means, carrying out a call process according to the IP address, and a second calling means for, when the specific server has returned a specific signal in response to the request from the request means, carrying out a call process according to the input telephone number.

In the present invention of claim 3, the dialed telephone number is transmitted to the specific server for making a request for transmission of the IP address corresponding to the telephone number. The specific server returns the IP address corresponding to the telephone number if the telephone corresponding to the telephone number is an IP telephone, and returns a specific signal if the telephone corresponding to the telephone number is not an IP telephone. When the specific server has returned the IP address, a call process is performed according to the returned IP address, and when the specific server has returned the specific signal, a call process is carried out according to the input telephone number. In the present invention of claim 3, therefore, depending on the IP address or the specific signal is returned, it is possible to determine whether the telephone to which dialing is done is an IP telephone or not and also perform a call process toward an IP telephone and a non-IP telephone.

An IP telephone according to the present invention of claim 4 depends on claim 1, wherein, when a call is dialed to the opposite party through an operation of selecting a plurality of numerals forming a telephone number, the registration means carries out a process of registering the telephone number information.

In the present invention of claim 4, if an input of the called party's telephone number is done through the operation of ten keys (in this case, there is a high possibility that the telephone number information on the called party is not registered in the telephone directory), the process of registering the telephone number information on the called party is carried out. Thus, according to the present invention of claim 4, it is possible to avoid the registration of the telephone number information in the telephone directory from being forgotten.

An IP telephone according to the present invention of claim 5 depends on claim 4, wherein the registration means carries out the registration process in response to a predetermined operation after end of the call.

In the present invention of claim 5, the telephone number information on the called party is registered in the telephone directory after the call has been ended. Thus, according to the present invention of claim 5, the operation of registering the telephone number information in the telephone directory (entry of the called party's name, etc.) will not interfere with the call, and also it is possible to avoid the registration operation from being forgotten.

A management method according to the present invention of claim 6 is a management method to manage information showing whether a telephone of an opposite party of a call is an IP telephone or not and by which, in making the call, the opposite party's telephone is identified as an IP telephone or not, telephone management information including a telephone number is registered in a memory, and a marker is added to the telephone management information on the called party, out of the telephone management information registered in the memory, when result of determination is affirmative.

In the present invention of claim 6, in making a call, the opposite party's telephone is identified as an IP telephone or not, and the telephone management information including the opposite party's telephone number, name, etc. is registered in the telephone directory formed in the memory. Also, if the opposite party is an IP telephone, a marker indicating that the opposite party is an IP telephone, is added to the telephone management information on the opposite party registered in the telephone directory (memory). According to the present invention of claim 6, therefore, in making a call to the opposite party from next time onward, it is possible to know before conducting communication whether the opposite party's telephone is an IP telephone or not by the presence or absence of the marker, which makes it possible to make a decision in advance to speak short or having a long conversation in consideration of the telephone rate.

A program according to claim 7 is a program that is executed by a CPU included in an IP telephone, and comprises an identification step of identifying whether an opposite party's telephone is an IP telephone or not in making a call, a registration step of registering telephone management information including a telephone number in a memory, and an addition step of adding a marker to the telephone management information on the opposite party, out of the telephone management information registered in the memory, when result of determination in the determining step is affirmative.

In the present invention of claim 7, it is determined in making a call whether or not the telephone of the opposite party is an IP telephone, and the telephone management information including the opposite party's the telephone number, name, etc. is registered in the telephone directory formed in the memory. Also, if the opposite party is an IP telephone, a marker indicating the opposite party is on an IP telephone is added to the telephone management information on the opposite party registered in the telephone directory (memory). According to the present invention of claim 7, therefore, in making a call to the opposite party from next time onward, it is possible to know before conducting communication whether the opposite party's telephone is an IP telephone or not by the presence or absence of the marker, which makes it possible to make a decision in advance to speak short or have a long conversation in consideration of the telephone rate.

According to the present invention, it is possible to know before making a call whether the called party is an IP telephone or not, which allows a caller before making a call to make a decision to state only his/her business shortly or have a long conversation.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
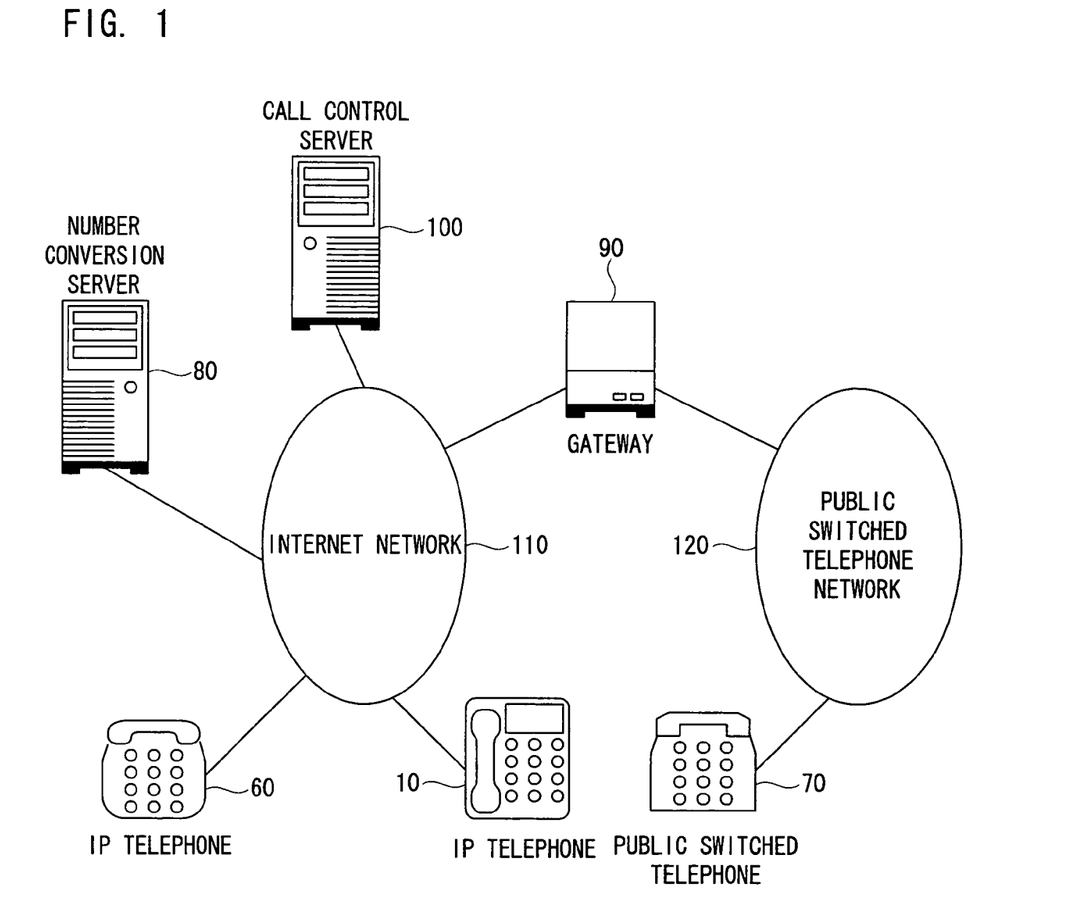
FIG. 1 is a block diagram showing overall structure of one embodiment of the present invention.

An IP telephone 10 as one embodiment of the present invention shown in FIG. 1 is connected to an Internet network 110 (including a dedicated IP network) 110. The Internet network 110 is connected with an IP telephone 60, a number conversion server 80 and a call control server 100 as well as the IP telephone 10. Also, the Internet network 110 is connected with a public switched telephone network 120 via a gateway 90. The public switched telephone network 120 is connected with a public switched telephone 70.

Figure 2:
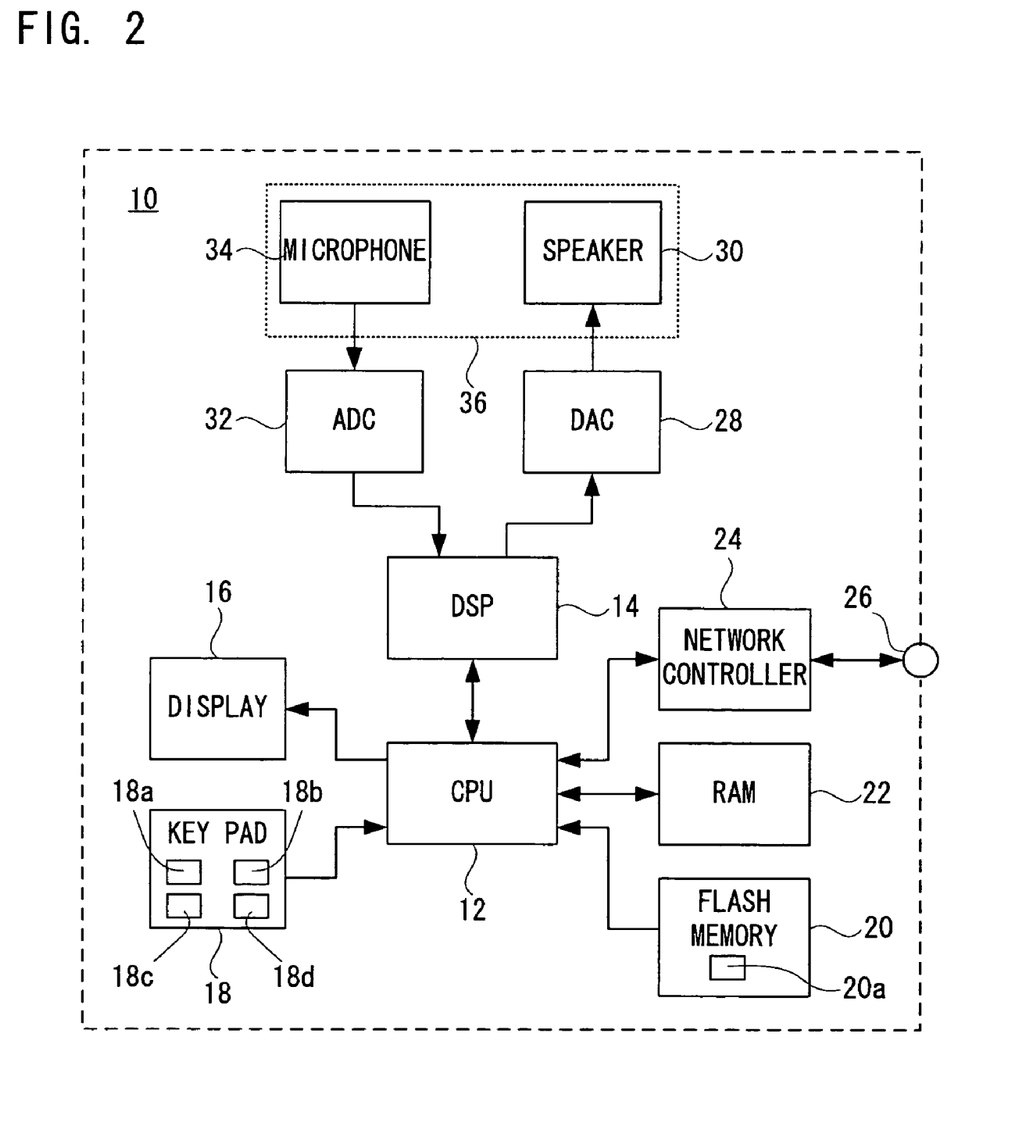
FIG. 2 is a block diagram showing structure of an IP telephone of the present invention.

The IP telephone 10 is specifically structured as shown in FIG. 2. As can be understood from FIG. 2, the IP telephone 10 includes a CPU 12. The CPU 12 is connected with a DSP 14, a display 16, a keypad 18, a flash memory 20, a RAM 22, and a network controller 24. The DSP 14 is connected via a D/A converter 28 with a speaker 30 provided in a handset 36, and connected via an A/D converter 32 with a microphone 34 provided likewise in the handset 36.

The network controller 24 is connected to a communication connector 26. The communication connector 26 is connected to the Internet network 110 through a predetermined cable. Therefore, the CPU 12 can transmit and receive data to and from the Internet network 110 via the network controller 24 and the communication connector 26.

Figure 3:
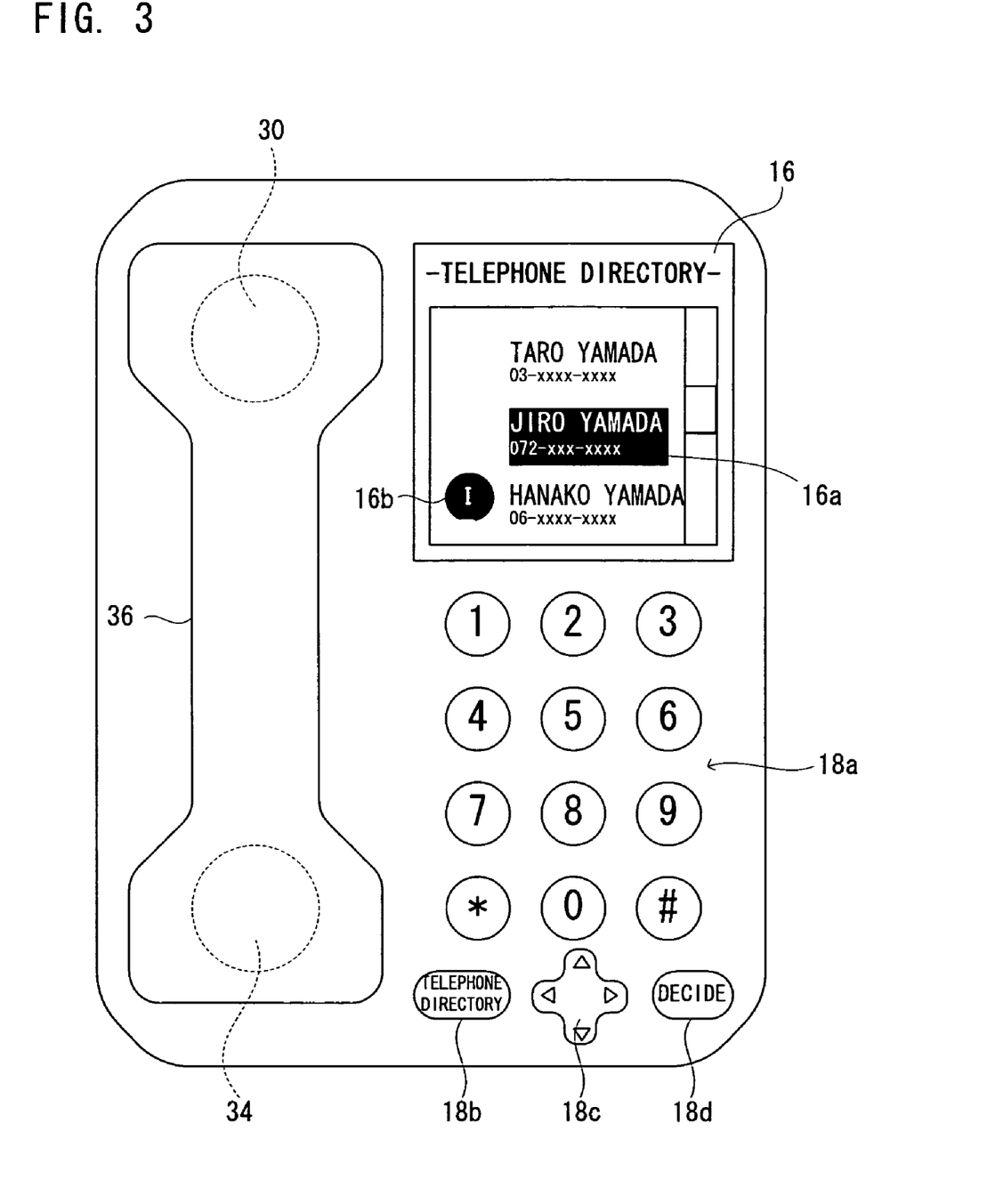
FIG. 3 is an illustrative view showing an external appearance of the IP telephone of the present invention.

An external appearance of the IP telephone 10 is formed as shown in FIG. 3. As seen from FIG. 3, a ten key 18a, a "telephone directory" button 18b, a cross key 18c, and a "decision" button 18d are provided to the keypad 18.

Figure 4:
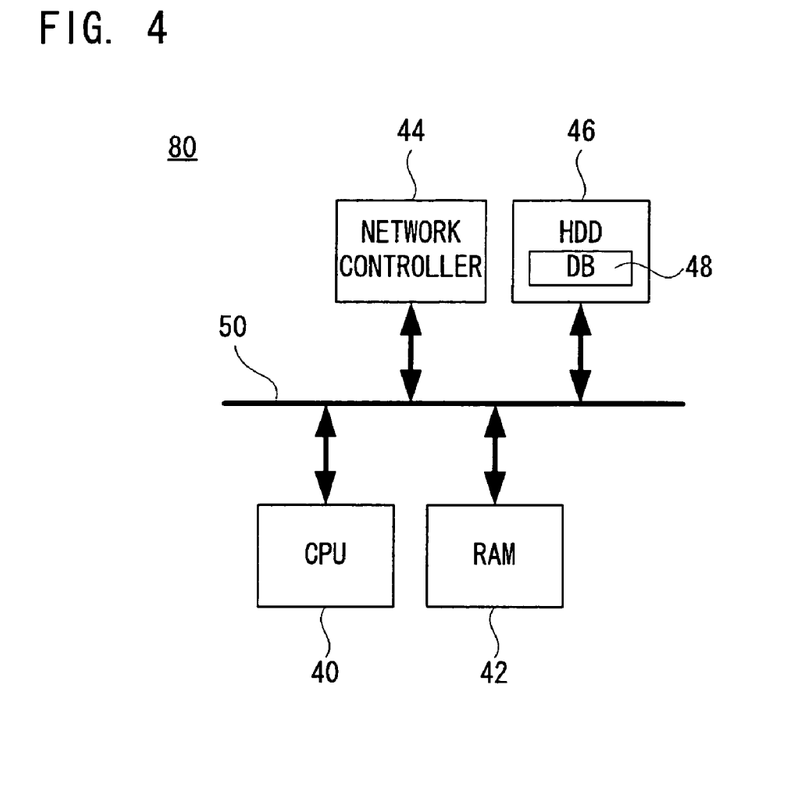
FIG. 4 is a block diagram showing schematic structure of a number conversion server.

The number conversion server 80 is a server for converting a called party's telephone number into an IP address if the called party is an IP telephone. More specifically, this is structured as shown in FIG. 4. As is apparent from FIG. 4, the number conversion server 80 includes a CPU 40. The CPU 40 is connected via a bus 50 with a RAM 42, a network controller 44, and a hard disk drive (HDD) 46. Also, a database 48 is formed in the HDD 46. This database 48 records telephone numbers and IP addresses in pairs and is used to convert a telephone number into an IP address.

In making a call from the IP telephone 10 to a desired telephone, the IP telephone 10 transmits the desired telephone's telephone number to the number conversion server 80 to inquire whether the desired telephone is an IP telephone or not. If the desired telephone is an IP telephone 60, the number conversion server 60 consults the database 48 and converts the telephone number into an IP address, and then transmits the IP address to the IP telephone 10. On the other hand, the desired telephone is a public switched telephone 70, the number conversion server 80 transmits to the IP telephone 10 an identification signal indicating that the inquired number is an number of the public switched telephone 70.

When the IP telephone 10 has received the IP address, the IP telephone 10 transmits the IP address of the IP telephone 60 to the call control server 100 to make a request for connection with the IP telephone 60. Upon receipt of the request, the call control server 100 calls the IP telephone 60. When the IP telephone 60 has responded to the call (a handset is picked up and in an off-hook state), the IP telephone 10 and the IP telephone 60 are connected to each other.

On the other hand, when the IP telephone 10 has received the identification signal, the IP telephone 10 transmits the telephone number of the public switched telephone 70 to the call control server 100 to make a request for connection with the public switched telephone 70. Upon receipt of the request, the call control server 100 calls the public switched telephone 70 through the gateway 90. When the public switched telephone 70 has responded to the call (a handset is picked up and in the off-hook state), the IP telephone 10 and the public switched telephone 70 are connected to each other via the gateway 90.

The IP telephone 10 of this embodiment recognizes that the called party is an IP telephone, based on the IP address that is returned from the number conversion server 80 in making a call to an IP telephone, and makes a record to the effect that the called party is an IP address, in a telephone directory 20a formed in the flash memory 20. Accordingly, when the telephone directory 20a is opened, the section of the called party as an IP telephone shows a marker 16b (FIG. 3) indicative of an IP telephone in addition to the called party's name and number. Thus, in making a call next time, it is possible to know whether the called party is an IP telephone or a public switched telephone, from the display of the marker 16b indicative of an IP telephone in the telephone directory 20a, which allows a caller to get prepared for conversation before making the call.

In the case where the calling party is an IP telephone, the telephone rate is free or low or unlimited conversation is allowed for a standard charge if the called party is also an IP telephone, whereas a fee is charged for the call if the called party is a public switched telephone or the like other than IP telephone. With a conventional IP telephone, it is impossible to know in advance whether the called party is an IP telephone or not. However, according to the IP telephone 10, it is possible to know in advance whether the called party is an IP telephone or not. As a consequence, the user of the IP telephone 10 can make a decision in advance to have a long conversation if the called party is an IP telephone or speak short with a summary of what he/she will talk about if the called party is a public switched telephone or the like other than IP telephone.

The operation of the CPU 12 contained in the IP telephone 10 will be described below with the use of a flowchart shown in FIG. 6 and FIG. 7. In addition, the CPU 12 operates according to the program recorded in the flash memory 20.

Figure 6:
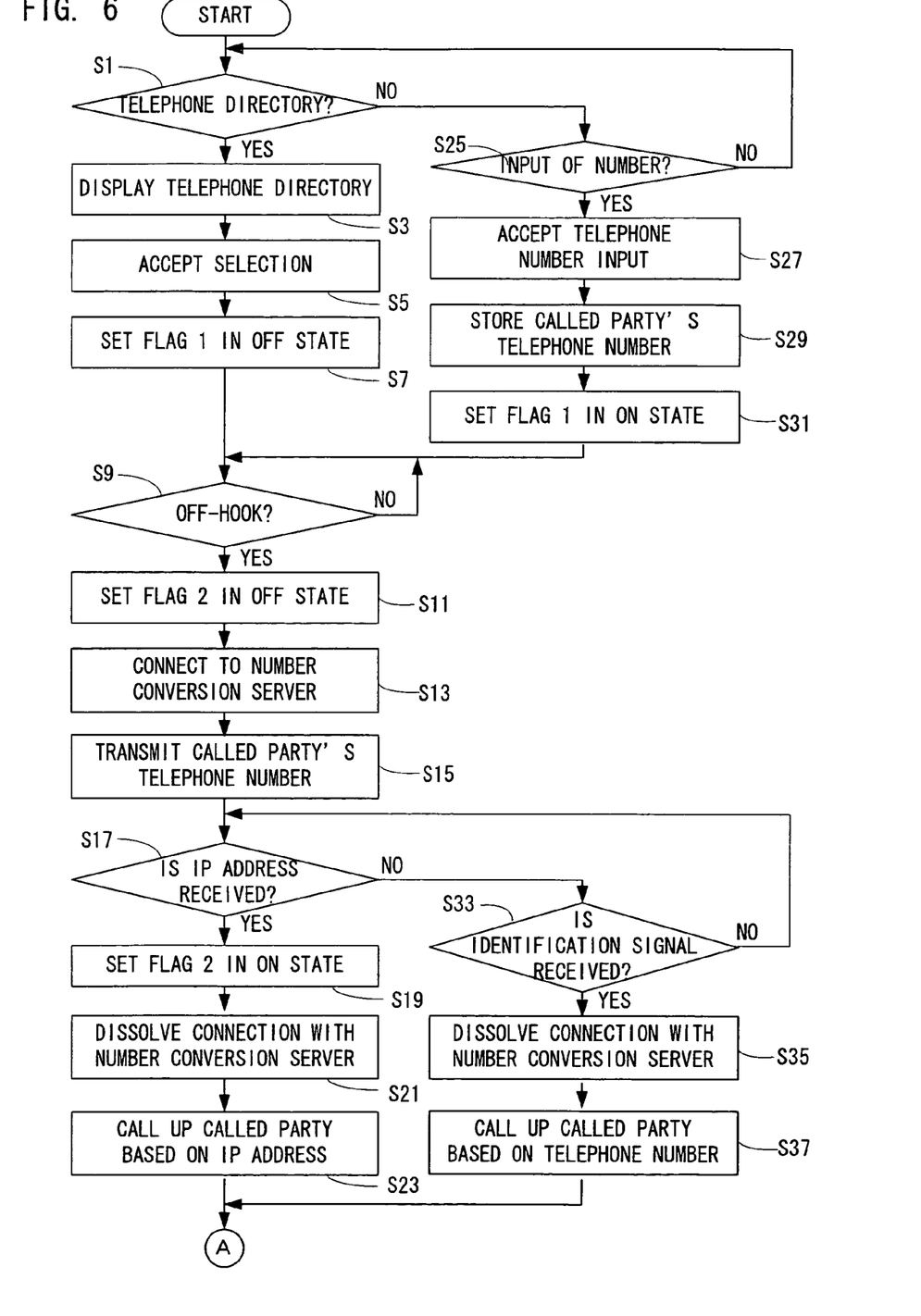
FIG. 6 is flowchart showing an operation of a CPU of the IP telephone of the present invention.

When the user presses the button 18b (FIG. 3), it is determined in a step S1 of FIG. 6 that a request is made for display of the telephone directory 20a, and the telephone directory 20a as illustrated in FIG. 3 appears in the display 16. The user operates the cross key 18c to move the cursor (displayed in reverse video) 16a and select the party to be called. This selection is accepted in a step S5. In a step S7, a flag 1 is set in an off state. The flag 1 is a flag for determining whether or not the called party's telephone number is input by hand (with use of the ten key 18a). Thus, this is why the flag 1 is set in the off state in the step S7.

Then, when the user lifts the handset 36, it is determined in a step S9 that the telephone is in the off-hook state. In a step S11, a flag 2 is set in an off state (initialized). The flag 2 is a flag for describing the called party as an IP telephone or not. If the called party is an IP telephone, the flag 2 is set in the on state.

In a step S13, a connection is made to a number conversion server 80. In a step S15, the called party's telephone number is transmitted to the number conversion server 80 in order to determine whether the called party is an IP telephone or a public switched telephone.

Besides, if the called party's telephone number is not registered in the telephone directory 20a, the user inputs the telephone number directly by means of the ten key 18a. When the ten key 18a is operated, it is concluded in a step S25 that the telephone number is being input, and the input of the telephone number is accepted in a step S27. In a step S29, the input telephone number is stored in the RAM 22 for later processing. Then, the flag 1 is set in the on state in a step S31 to indicate that the telephone number is manually input.

When the user lifts the handset 36, it is concluded in the step S9 that the telephone is in the on-hook state, and the flag 2 is set in the off state (initialized) in the step S11. In the step S13, a connection is made to the number conversion server 80, and in the step S15, the input telephone number is transmitted to the number conversion server 80.

When the telephone number of the called party is transmitted from the IP telephone 10 to the number conversion server 80, if the called party is an IP telephone, the IP address of the called party's IP telephone is returned, and if the called party is a public switched telephone or the like other than IP telephone, the identification signal indicative of the called party as a public switched telephone is returned.

Upon return of the IP address, YES is determined in a step S17, the flag 2 is set in the on state in a step S19 to indicate that the called party is an IP telephone. Then, the number conversion server 80 is disconnected in a step S21. In a step S23, the called party is called on the basis of the IP address returned from the number conversion server 80. At that time, the IP telephone 10 transmits the IP address to the call control server 100, and the call control server 100 calls up the called party's telephone.

On the other hand, when the identification signal is returned from the number conversion server 80, YES is determined in a step S33, and the number conversion server 80 is disconnected in a step S35. Then, in a step S37, the called party is called on the basis of the called party's telephone number. At that time, the IP telephone 10 transmits the IP address to the call control server 100, and the call control server 100 calls up the called party's telephone.

Figure 7:
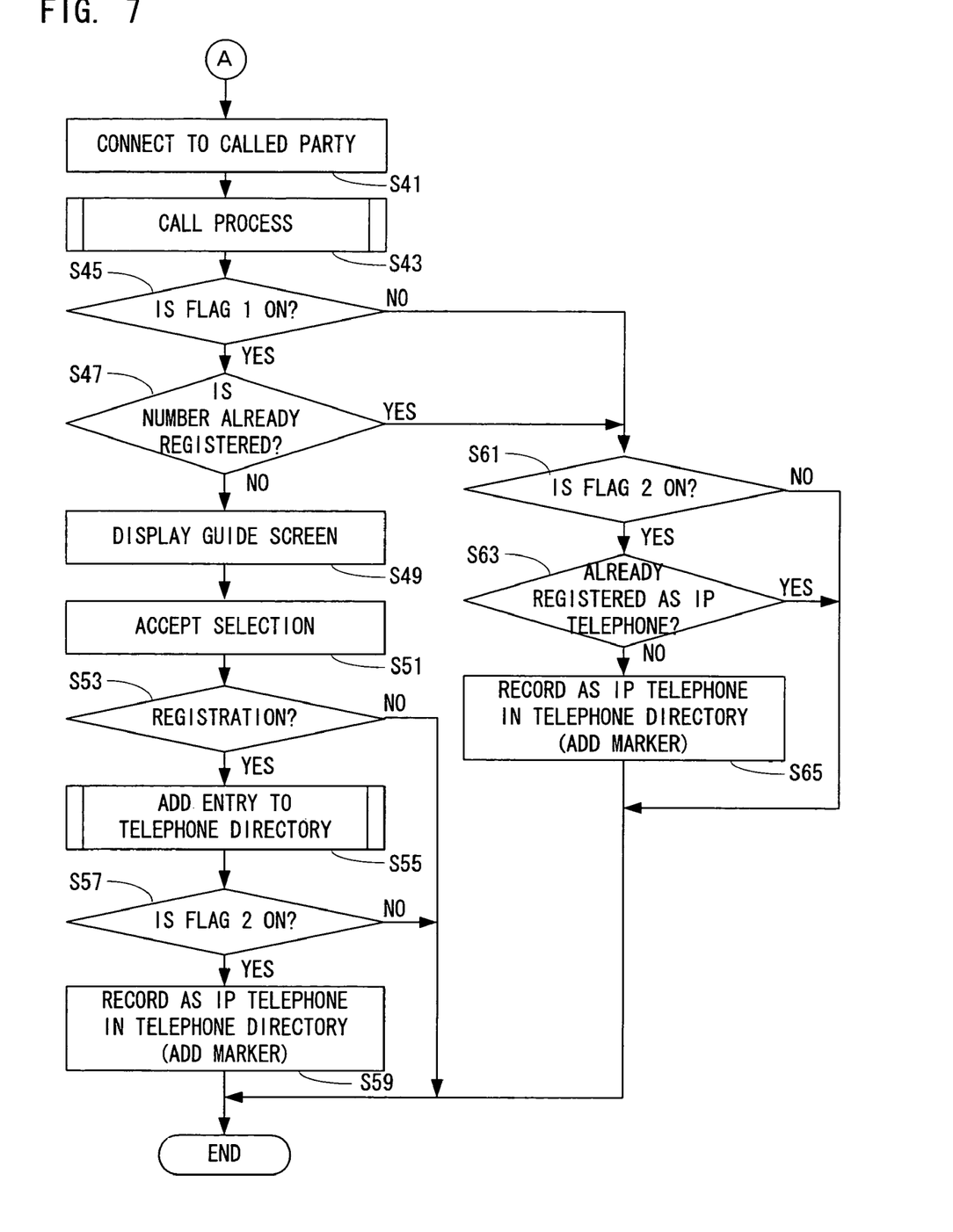
FIG. 7 is a flowchart continued from FIG. 6.

When the called party answers the call (picks up the handset to enter into the off-hook state), connection with the called party is established in a step S41 of FIG. 7, and a call process is carried out in a step S43. A detailed description of the call process is omitted here.

If the calling party and the called party put down the handsets to change into the on-hook state during the call process, the call process is terminated, and then it is determined in a step S45 whether the flag 1 is in the on state or not, that is, whether the called party's telephone number is input manually or not.

If the telephone directory 20a is used to select the called party, NO is determined in a step S45, and it is determined in a step S61 whether the flag 2 is in the on state or not, that is, whether the called party is an IP telephone or not.

If the called party is an IP telephone, it is determined in a step S63 whether or not the called party is already registered as an IP telephone in the telephone directory 20a. If NO is determined in the step S63, the called party is registered as an IP address in the telephone directory 20a in a step S65.

If the called party is already registered as an IP telephone in the telephone directory 20a, YES is determined in the step S63, and the step S65 is skipped. Meanwhile, if the called party is not an IP telephone, NO is determined in the step S61, and the step S63 and the step S65 are skipped.

If the called party's telephone number is input manually, YES is determined in the step S45, it is determined in a step S47 whether or not the called party's telephone number manually input and stored in the RAM 22 is already registered in the telephone directory 20a. If the telephone number is already registered in the telephone directory 20a, the process proceeds to the step S61 and the following ones. If the called party is an IP telephone and is not yet registered as an IP address, the marker 16b indicating that the called party is an IP telephone is registered in the telephone directory 20a.

Figure 5:
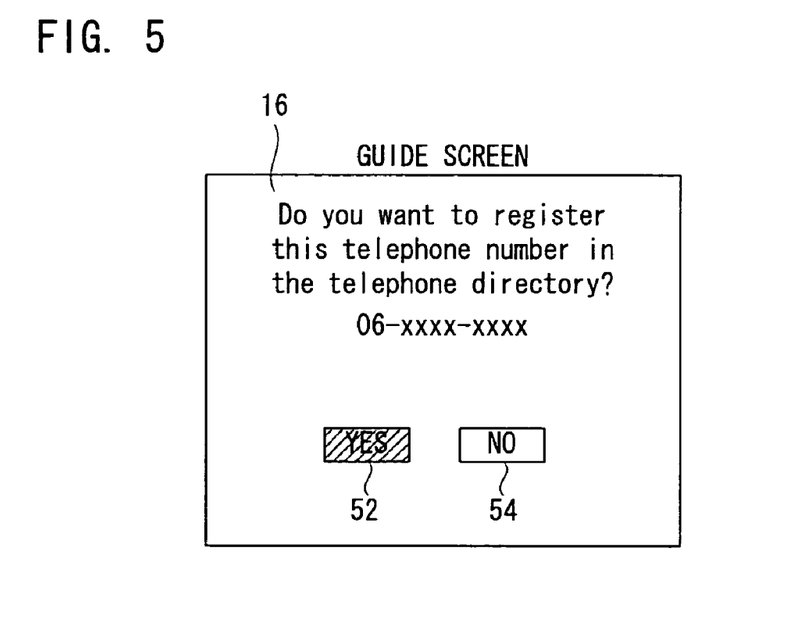
FIG. 5 is an illustrative view showing one example of presentation of a display.

If the telephone number is not registered in the telephone directory 20a, a guide screen as shown in FIG. 5 appears on the display 16 in a step S49. As is apparent from FIG. 5, the guide screen displays a message "Do you want to register this telephone number in the telephone directory?", the called party's telephone number, a "YES" button 52 and a "NO" button 54. When either the button 52 or the button 54 is selected by means of the cross key 18c (FIG. 3), if a "Decide" button 18d (FIG. 3) is pressed, the selection is accepted in a step S51.

If "YES" is selected, a "process for adding an entry to the telephone directory" is carried out in a step S55. In the "process for adding an entry to the telephone directory", the user inputs the called party's name by using the ten key 18a and the cross key 18c. Accordingly, a new entry is added to the telephone directory 20a, and the called party's telephone number stored in the RAM 22 and the called party's name input by the user are recorded in the added entry. Then, it is determined in a step S57 whether or not the flag 2 is in the on state, that is, whether or not the called party is an IP telephone. If it is concluded that the called party is an IP telephone, the marker 16b indicating that the called party is an IP telephone, in a step S59, is attached to the section of the called party newly registered in the telephone directory 20a.

If the user selects "NO" in the guide screen shown in FIG. 5, the processes of the step S55 and the following ones are skipped to terminate the program. Thus, the called party's telephone number is not registered in the telephone directory 20a.

As described above, if a telephone call is made using the IP telephone 10 and the called party is an IP telephone, the called party is registered as an IP telephone in the telephone directory 20a. Also, in making a call from next time onward, the telephone directory 20a shown in the display 16 presents the marker 16b indicating that the called party is an IP telephone is prefixed to the called party's name and telephone number. The user of the IP telephone 10 can thus know that the called party is an IP telephone or not before making a call, and make a decision in advance to speak short in consideration of the telephone rate or have a long talk because the rate is free or low, or unlimited conversation is allowed for a standard charge.

The above described embodiment is configured as to make it possible to know in making a telephone call, whether the called party is an IP telephone or not. Alternatively, when the call is received, the calling party may be identified as an IP telephone or not and registered in the telephone directory 20a.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An IP telephone that makes it possible for a user to know before making a connection with a party to be called whether the party to be called is an IP telephone or not, the IP telephone comprising:
 a display to display a plurality of opposite parties' telephone numbers;
 a cursor and a key to move the cursor on the display thereby to select an opposite party's telephone number to be called;
 a memory operatively coupled to the display;
 a registerer that stores telephone management information into the memory, the telephone management information including at least a telephone number of an opposite party; and
 an adder that automatically adds a marker to telephone management information on an opposite party when the IP telephone determines that the opposite party's telephone is an IP telephone;
 whereby the display displays to the user a plurality of the telephone numbers and indicates to the user, via the marker, whether the opposite party's telephone number is an IP telephone or not according to the telephone management information in the memory before making a connection with the opposite party.

2. The IP telephone according to claim 1, wherein said display displays whether the opposite party's telephone is an IP telephone or not in response to a specific operation.

3. The IP telephone according to claim 2, wherein said specific operation includes a calling operation.

4. The IP telephone according to claim 1, further comprising:
 a requester to request a specific server to transmit an IP address corresponding to a dialed telephone number;
 a first calling device that, when said specific server has returned said IP address in response to the request from said requester, carries out a call process according to said IP address; and
 a second calling device that, when said specific server has returned a specific signal in response to the request from said requester, carries out a call process according to said input telephone number.

5. The IP telephone according to claim 1, wherein, when a call is dialed to said opposite party through an operation of selecting a plurality of numerals forming a telephone number, said registerer carries out a process of registering said telephone number information.

6. The IP telephone according to claim 5, wherein said registerer carries out said registration process in response to a predetermined operation after end of the call.

7. A management method to manage information showing whether a telephone of an opposite party of a call is an IP telephone or not, comprising:
 displaying a plurality of opposite parties' telephone numbers on a display;
 using a key to move a cursor on the display thereby to select an opposite party's telephone number to be called;
 providing a memory and operatively coupling a memory to the display;

storing telephone management information into the memory, the telephone management information including at least a telephone number of an opposite party;

automatically adding a marker to telephone management information on an opposite party when the IP telephone determines that the opposite party's telephone is an IP telephone; and after the step of adding the marker, making a connection to the telephone of the opposite party;

whereby a plurality of the telephone numbers are displayed to the user and the marker indicates to the user whether the opposite party's telephone number is an IP telephone or not according to the telephone management information in the memory before making a connection with the opposite party.

8. A storage medium which stores a program to be executed by a processor included in an IP telephone including a memory, a display, and a key, the program causing execution of the following steps:

displaying a plurality of opposite parties' telephone numbers on the display;

using the key to move a cursor on die display thereby to select an opposite party's telephone number to be called;

operatively coupling the memory to the display;

storing telephone management information into the memory, the telephone management information including at least a telephone number of an opposite party;

automatically adding a marker to telephone management information on an opposite party when the IP telephone determines that the opposite party's telephone is an IP telephone; and after the step of adding the marker, making a connection to the telephone of the opposite party;

whereby a plurality of the telephone numbers are displayed to the user and the marker indicates to the user whether the opposite party's telephone number is an IP telephone or not according to the telephone management information in the memory before making a connection with the opposite party.

9. The storage medium according to claim 8, wherein the program further causes execution of a step of providing a program memory in the IP telephone.

* * * * *